UNITED STATES PATENT OFFICE.

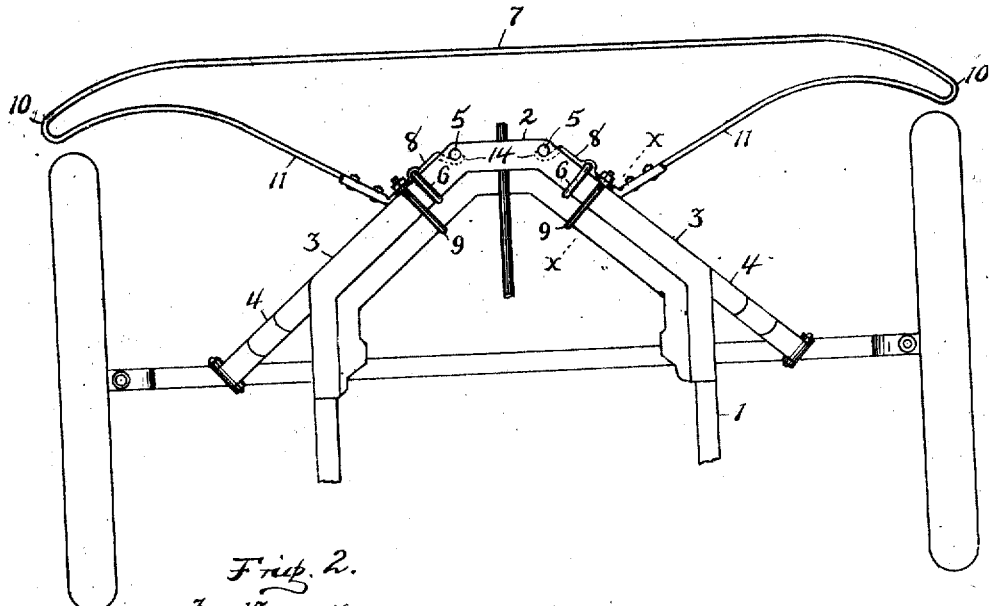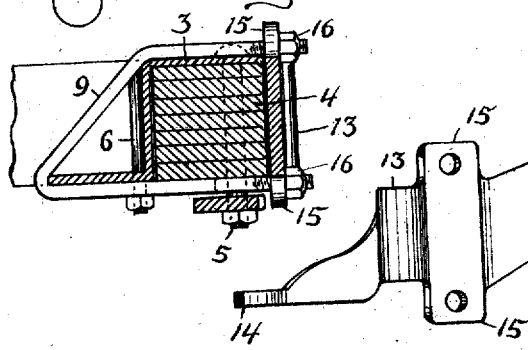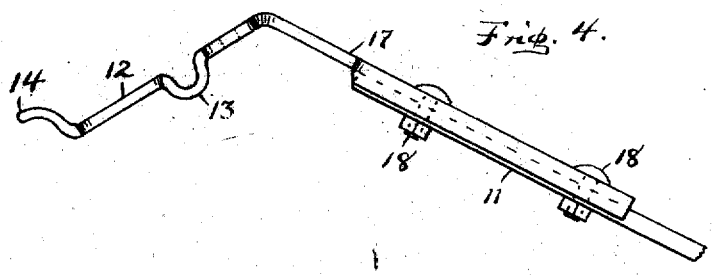

CHARLES BOWEN, OF FORT WAYNE, INDIANA, ASSIGNOR OF ONE-THIRD TO FRED GASKINS AND ONE-THIRD TO ARTHUR G. NIEBERGALL, BOTH OF FORT WAYNE, INDIANA.

BUMPER FOR AUTOMOBILES.

1,329,334.     Specification of Letters Patent.     Patented Jan. 27, 1920.

Application filed November 8, 1919. Serial No. 336,614.

*To all whom it may concern:*

Be it known that I, CHARLES BOWEN, a citizen of the United States of America, and resident of Fort Wayne, in the county of Allen and State of Indiana, have invented certain new and useful Improvements in Bumpers for Automobiles, of which the following is a specification.

This invention relates to improvements in bumpers for automobiles of that type in which the frame of the automobile has a protruding end with receding sides and which is also provided with a pair of vertically disposed pendant bolts, and the object of the improvement is to provide means for supporting a bumper of the spring bar type in connection with the frame of the automobile so that the respective ends of the bar forming the bumper will be firmly anchored and properly positioned relative to the frame of the automobile; and to so construct the securing means for the bumper that it may be applied to the frame of the machine without disturbing or altering any of the parts thereof.

The object of the invention is accomplished by the construction illustrated in the accompanying drawings in which:—

Figure 1 is a plan view of the bumper and that portion of an automobile to which the bumper is secured;

Fig. 2 is an enlarged detail view showing a cross-section on the line *x—x* of Fig. 1;

Fig. 3 is a front elevation of one of the supporting brackets for the bumper including the corresponding end of the bumper attached thereto; and Fig. 4 is a plan view of Fig. 3.

Similar characters of reference indicate corresponding parts throughout the several views and having reference now to the same;

1 is the frame of an automobile having a protruding end 2 and divergent opposite sides 3, there being supporting springs 4 secured respectively in connection with the divergent sides of the frame by means of corresponding bolts 5 and clips 6. The invention is comprised of the bumper proper 7, the supporting brackets 8 and the securing members 9 for the brackets. The bumper proper is formed of a flat bar of spring metal with oppositely projecting hooks 10 and corresponding inwardly slanting extremities 11; each bracket is formed with a base portion 12 adapted to fit against the corresponding divergent side of the frame, there being an arch 13 formed therein so as to fit over the clip 6 and an inwardly extending hook 14 at its forward extremity adapted to engage the depending end of the corresponding bolt 5 of the frame, the base having also vertically projecting perforated lugs 15 adapted for the reception of the ends of the securing member 9 so that the base may be secured in place, by the nuts 16, each bracket having also an outwardly extending arm 17 shaped to receive the corresponding extremity 11 of the bumper proper which is secured thereto by means of bolts 18; and the securing members 9 are each comprised of a clip shaped to encompass the frame and with its respective ends extending through the corresponding perforated lugs in the base so that the latter may be rigidly secured in position on the frame by tightening the nuts respectively on the ends of the clip.

By forming the brackets with the inwardly extending hooks which engage the bolts that depend from the frame a single securing member only for each bracket is required for holding it in fixed position on the frame so that the bracket cannot be tilted by the bumper when it encounters an obstruction. In this manner the inner ends of the bumper are anchored rigidly in connection with the frame and supported fixedly in position by its ends.

What I claim is:—

1. In a device of the class described, a bumper proper having inwardly slanting extremities; a pair of brackets, each formed with oppositely projecting perforated lugs and having a hook at its forward end and an outwardly extending arm secured to the corresponding extremity of the bumper proper; and a securing member for each bracket.

2. In a bumper for automobiles having a protruding frame with receding sides and pendant bolts at its front end, a bumper proper shaped with inwardly extending extremities; a pair of brackets each having a base shaped to fit flatly against the receding side of the frame and having a hook for engagement with the corresponding bolt, and having also an outwardly extending arm secured to the corresponding extremity of the bumper proper; and means for clamping the base of each bracket to the frame.

3. In a bumper for automobiles having a frame the sides of which recede from its end, a bumper proper comprised of a spring bar shaped with inwardly extending extremities; a supporting bracket for each extremity of the bumper, having an outwardly extending arm secured thereto, and a forwardly extending base adapted to fit against the corresponding receding side of the frame; and a securing member for the base of each bracket.

4. In a bumper for automobiles having a frame with a protruding end, a bumper proper formed of a spring bar shaped with inwardly extending extremities, and a supporting bracket for each extremity having an outwardly extending arm secured thereto and a base that extends forwardly from the arm and being adapted to be secured to the corresponding side of the frame, the forward end of each base having a hook formed thereon.

In testimony whereof I affix my signature in presence of two witnessses.

CHARLES BOWEN.

Witnesses:
CLARENCE F. COOK,
C. C. DILWORTH.